United States Patent
Broderson et al.

(10) Patent No.: US 7,975,312 B2
(45) Date of Patent: Jul. 5, 2011

(54) TOKEN PASSING TECHNIQUE FOR MEDIA PLAYBACK DEVICES

(75) Inventors: Rainer Broderson, San Jose, CA (US); Jeffrey Robbin, Los Altos, CA (US); Augustin J. Farrugia, Cupertino, CA (US); Rod Schultz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1214 days.

(21) Appl. No.: 11/651,339

(22) Filed: Jan. 8, 2007

(65) Prior Publication Data

US 2008/0168568 A1 Jul. 10, 2008

(51) Int. Cl.
*H04L 9/12* (2006.01)
(52) U.S. Cl. ............... 726/30; 726/2; 713/189; 380/203; 380/277
(58) Field of Classification Search ............... 726/29, 726/30
See application file for complete search history.

(56) References Cited

U.S. PATENT DOCUMENTS

| | | | |
|---|---|---|---|
| 6,856,800 B1 * | 2/2005 | Henry et al. | 455/411 |
| 7,134,138 B2 * | 11/2006 | Scherr | 726/2 |
| 7,243,242 B2 * | 7/2007 | Moriai | 713/300 |
| 2002/0035692 A1 * | 3/2002 | Moriai | 713/189 |
| 2002/0136405 A1 * | 9/2002 | Hori | 380/203 |
| 2002/0150250 A1 * | 10/2002 | Kitaya et al. | 380/277 |
| 2002/0178360 A1 * | 11/2002 | Wenocur et al. | 713/170 |
| 2003/0027454 A1 * | 2/2003 | Sugiyama | 439/588 |
| 2003/0142827 A1 * | 7/2003 | Ohwada et al. | 380/277 |
| 2003/0187883 A1 * | 10/2003 | Zelenka et al. | 707/201 |
| 2004/0175098 A1 * | 9/2004 | Calhoon et al. | 386/46 |
| 2005/0004873 A1 * | 1/2005 | Pou et al. | 705/51 |
| 2005/0154909 A1 * | 7/2005 | Zhang et al. | 713/200 |
| 2005/0198489 A1 | 9/2005 | Wallace et al. | |
| 2006/0247976 A1 * | 11/2006 | Posokhow et al. | 705/26 |
| 2007/0005506 A1 * | 1/2007 | Candelore | 705/59 |

FOREIGN PATENT DOCUMENTS

EP 1 370 023 A1 12/2003

OTHER PUBLICATIONS

International Preliminary Report on Patentability issued on Jul. 14, 2009, for PCT Application No. PCT/US2008/000160, filed on Jan. 3, 2008, 5 pages.
International Search Report and Written Opinion mailed on May 22, 2008, for PCT Application No. PCT/US08/00160, filed on Jan. 3, 2008, 3 pages.
European Search Report mailed on Jun. 11, 2008, for EP Application No. 08150035.7, filed on Jan. 3, 2008, 6 pages.

* cited by examiner

*Primary Examiner* — Kambiz Zand
*Assistant Examiner* — Yonas Bayou
(74) *Attorney, Agent, or Firm* — Morrison & Foerster LLP

(57) ABSTRACT

A digital rights management (DRM) system for distribution of digital content such as audio or video uses a token passing scheme to enhance security of the content from unauthorized access and use, including access by unauthorized players. The token is requested from the central content or DRM server by a host device such as a user's computer, using security related information. The token is then passed to a media player associated with the host device, the token being encrypted using a key special to that particular player. Upon receipt of the token, the player transmits back to the server certain related security information confirming receipt of the token and in return receives keys for decryption of the associated digital content. In the absence of proper passing of the token, player access to the content, or further access to other content, is denied. This also allows the player to communicate directly with the server for obtaining the keys.

41 Claims, 3 Drawing Sheets

TOKEN PASSING TECHNIQUE FOR MEDIA PLAYBACK DEVICES

FIELD OF THE INVENTION

This invention relates to Digital Rights Management (DRM) for protection of audio and video data in a playback device such as a computer or audio or video media player.

BACKGROUND

The protection of digital content transferred between computers over a network and transferred from a computer or other host device or a server to an associated playback device is important for many organizations. The DRM process often involves encrypting the pieces of content (e.g., encrypting the binary form of the content) to restrict usage to those who have been granted a right to the content, which is typically pieces of music or video programs.

Cryptography is the traditional protection method, but for many digital file transfer situations, a party that legitimately receives the content might try to break the DRM protection scheme, so as to give illicit access to third parties. Hence an identified weak link in the DRM security is in the overall process, rather than the encryption scheme. For instance, one of the more successful DRM schemes distributes music and video content via the Internet. The DRM system distributes to a user's computer content that has been encrypted. The user's computer then decrypts the received content, generates local keys for encrypting the content, and uses the local keys to re-encrypt the content. Typically the content in encrypted form may also be downloaded, via a local connection such as a USB (universal serial bus) connection, to an associated playback-only device such as an audio or video media player, which similarly decrypts and re-encrypts the content before playing same.

The present inventors have identified a potential security issue with this approach. There is a need to strengthen the security linking a particular playback device to the associated host device (computer) and also to the central server from which the content and/or DRM information is downloaded.

SUMMARY

In accordance with the invention, the playback (player) device, such as a media player or computer, is linked to the associated host device, such as a computer, and to a central server, by a token passing protocol (process) intended to guarantee that before any content is made available for play on the playback device, the genuineness of the playback device is established, in the sense that it indeed is authorized to receive and play the content. This improvement in the DRM system is intended to strengthen the overall system security, and especially to better secure the content (typically copyrighted material) from authorized access or use.

Thereby, a three way token exchange is provided which involves the content and/or DRM central server, or other source of the content or DRM information, the computer-like host device (such as a computer, cell phone, PDA, etc.) and the playback device also referred to here as the player (such as a media player but which also may be a cell phone or PDA.) Note that the central server may be in fact be a group of servers, such as an on-line music and video "store" selling such material. In some cases, the player has no user keypad (such as when it is a media player device), so the present process is intended in one embodiment to avoid the user of the player from having to enter authorization passwords, etc. into the player, since that would be inconvenient. In the present process, the host device is first conventionally authorized to communicate with the server. Then a DRM security protocol, of conventional type, is exchanged between the host device (which is for this process the "master" in computer network nomenclature) and the player (which is the "slave") Note the references here to the "host device" more particularly refer to a digital media player software application (computer program) for playing and organizing digital music and video files, and executed on a computer or equivalent. The program is also an interface to manage the content stored on a linked player, and allows connection to the server to download (typically purchased) digital content. Such applications are well known and typically supported on computers running various operating systems, such as the Apple Mac OS or Windows 2000, and may also run on other computer-like-devices such as cell phones, PDAs, etc.

After the protocol exchange, the player and host device each thereby have in their appropriate memory areas (storage) the conventional authorization certificate of the other device and an encryption key. The host device then sends to the server certain DRM related information, and receives from the server an authentication token, of a type known in the computer security/networking field. Typically such tokens operate as a "ticket", allowing only one entity to transmit a message at any given time. In this case the token is encrypted with a key related to the player, and the token is sent (via the host or directly) to the player, and not stored in the host device. In one embodiment the player is equipped with the requisite components and software to connect to the Internet for instance, and thereby directly to the central server, bypassing the host device.

The player upon receipt of the token sends back to the server (either directly, or via the host device), additional DRM related information, including the token itself and associated authenticating information. Last, the player receives from the server (directly or via the host device) the relevant DRM key(s) for conventionally decrypting the content, and a new token to be used for the next request. At this point, the player can download and play content from the host device or server. Of course, if the token passing fails, the content will not download, or at least the relevant keys will not be downloaded or are not accessible, preventing playing of the content. Hence successful token passing is essential for the DRM system to allow downloading/playing. One attendant advantage is that this prevents unauthorized players from obtaining the digital content and/or keys.

To further describe this token exchange process, the DRM token is transmitted from the host device, which is typically a "client" software application relative to the media content server, to the player. The token entitles the player to obtain the requisite DRM information directly from the server without, in some embodiments, the subsequent participation of the host device. In one embodiment, the request for the token comes from the host device to the server. The token is sent in response from the server back to the host device, which then in turn sends it to the player. The token is then sent by the player back to the server to obtain the proper decryption key(s) from the server, to allow play back of any media content obtained from the server. This process thereby allows direct communications between the server and player to obtain the keys. This is an improvement in terms of convenience over prior approaches not involving a token, but always requiring "synchronization" between the player and host device for obtaining both the DRM information and the media content. Hence this process allows the player to operate in more independent fashion.

DETAILED DESCRIPTION

Figure 1:
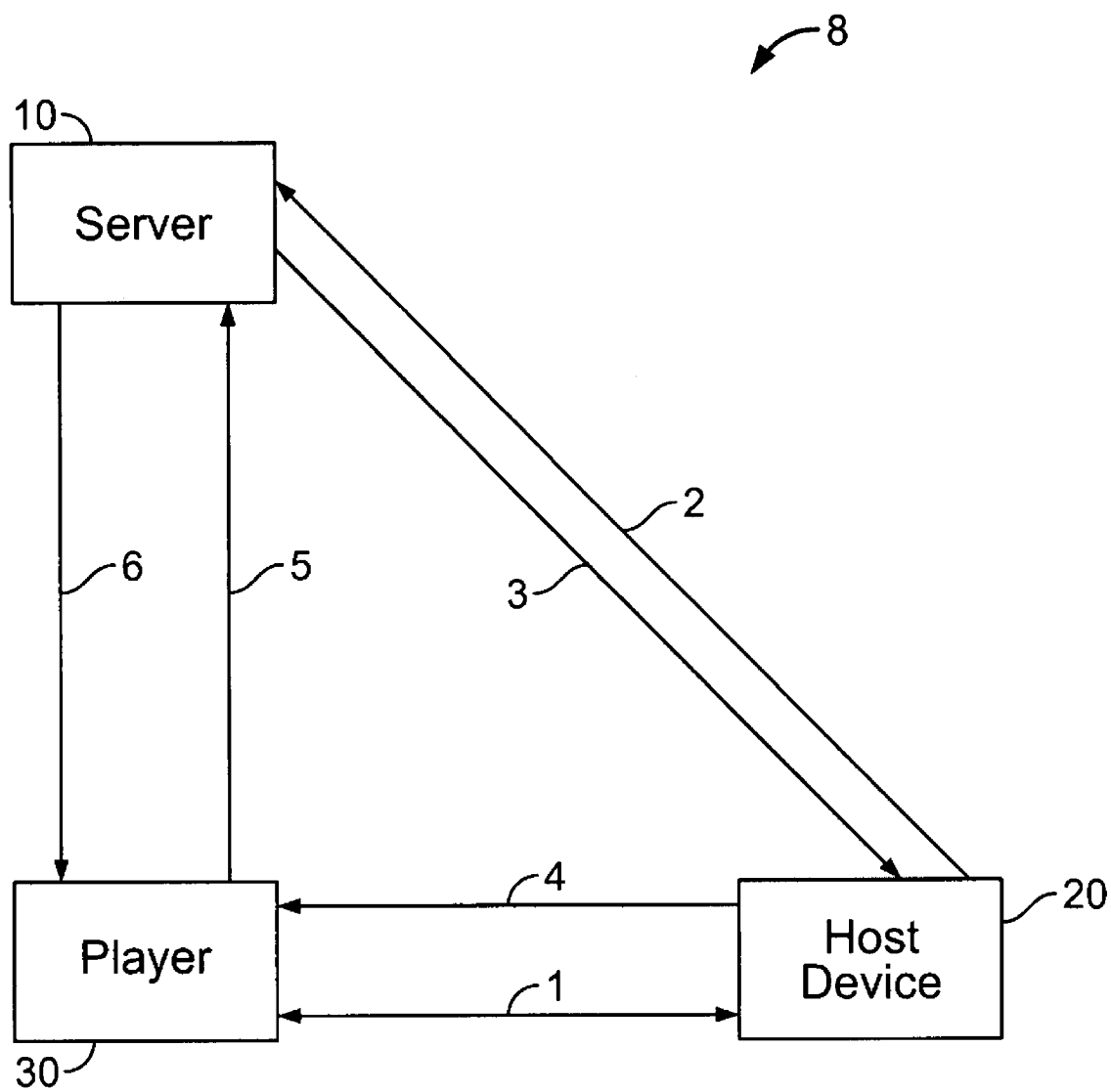
FIG. 1 shows a diagram illustrating elements of the present system.

FIG. 1 shows a media distribution system 8 and use of the present process. The system 8 includes the conventional (central) server 10, which conventionally stores a large library of purchasable media content and the DRM information associated therewith; server 10 may in fact be a set of servers, representing, e.g., an online music and/or video store. In communication with server 10 is the host device 20, of the type described above, and linked thereto via the Internet or other data network. Also in communication for DRM and download purposes with host device 20 is the media player 30, such as a conventional audio (music) and/or video player. Player 30 usually connects to host device 20 by a local connection, such as a USB cable or wireless connection, but this is not limiting. As shown, in some embodiments player 30 also has the capability to directly communicate with the server, both for DRM purposes and also to download media content, such as by an Internet connection. In a typical situation, a consumer owns player 30 and host, device 20, and obtains content for player 30 using the digital media player software application resident on host device 20. Of course, host device 20 can usually also play the content. The numbered lines in FIG. 1 denote the passage of particular DRM information as described below, with similar numbering. It is to be understood that the present process is in addition to the conventional DRM scheme as described above, also operative on the FIG. 1 system, involving encryption and the associated keys, but not described herein in further detail.

Referring to the numbered lines in FIG. 1, initially it is understood that a conventional shared DRM security protocol has been implemented, and that the host device 20 has been authorized thereby by the server 10 to begin the following process. Then at 1, the security protocol is exchanged between the host device 20 (master) and the player 30 (slave.) After this exchange is successful, the player has in its storage the authorization certificate of the host device, an encryption key derived from the protocol exchange. The authorization certificate (also referred to as a certificate or attribute certificate) is conventionally in the computer security field a digital document that describes a written permission from the issuer device to use a service or resource that the issuer controls or has access to use. After the exchange, the host device has in its storage the certificate of the player and the same encryption key. (It is assumed here for simplicity that the encryption technique is symmetric, so that the same key is used for encryption and decryption, but this is not limiting.)

At 2, the host device sends the following to the server to request the token for the player:

An account ID (identification number) associated with the particular user of the host device or the host device itself, with the server.

The GUID (global universal identifier) of the server (the source ID). GUID is a standard term referring to e.g. a 128 bit binary number used to identify in the computer field a component, file, user, etc.

The GUID of the player (the destination ID).

An authentication string (data) which is equal to the value of HMAC_HASH (source ID+destination ID+account ID+transformed key account+key ID of the transformed account key). Here HMAC_HASH refers to a well known mathematical function which is a hash (one-way) function based message authorization code well known in cryptography; well known types of HMAC are MD5, SHA, and others. Each key has an associated ID. Each key is conventionally obfuscated in storage (the key repository), and an obfuscated key is considered to be "transformed." Here the authentification uses information known to the authenticating device. The key ID is used if possible, but if it is not found then instead another key ID is used.

The key ID of the selected transformed account key.

The user name/user password for the account. (The user here is the consumer—the player owner.)

Next, at 3 the host device receives from the server the authentication token, which has already been encrypted with a key specially derived from some aspect (such as hardware) of the player. This key is intended to be unique to that particular player device. An example of the derivation uses an HMAC_HASH function as explained above, so the key value is equal to HMAC_HASH (destination GUID+Account ID+Static "Random"). In this case the value of Static "Random" may be a supplied random number. This token is preferably not stored in any key repository in the host device, but is sent at 4 to the player. (The key depository is conventionally storage—memory locations—allocated for encryption keys.)

Note that at 4, when the host device sends the token to the player, the token itself is sent in encrypted form, the encryption using the security protocol key derived in step 1 above. The player stores this key in its key repository.

Then at 5, the player retrieves the token from its key repository. The associated DRM session key is stored in an encrypted context that is passed back and forth from the host device to the player. The player then sends the following information to the server, directly as shown or via the host device:

The player GUID

The server GUID

The account ID

The token as received in step 4, signed (provided with a cryptographic signature) with e.g. the signature's public key.

A signature of the token. (The signature is of a type conventional in cryptography as an authentication technique, using in one embodiment public key-private key cryptography.)

The size (length in bits) of the token signature.

The player authorization certificate.

The size of the player authorization certificate.

Next at 6, the player receives the relevant key(s) for its key repository from the server directly, or via the host device, for the particular user account and player, and also a new token to be used for the next token request, and stores both in its storage. The received key(s) then are used conventionally by the player to decrypt the associated digital content, which is transferred to player 30 conventionally.

Figure 2:
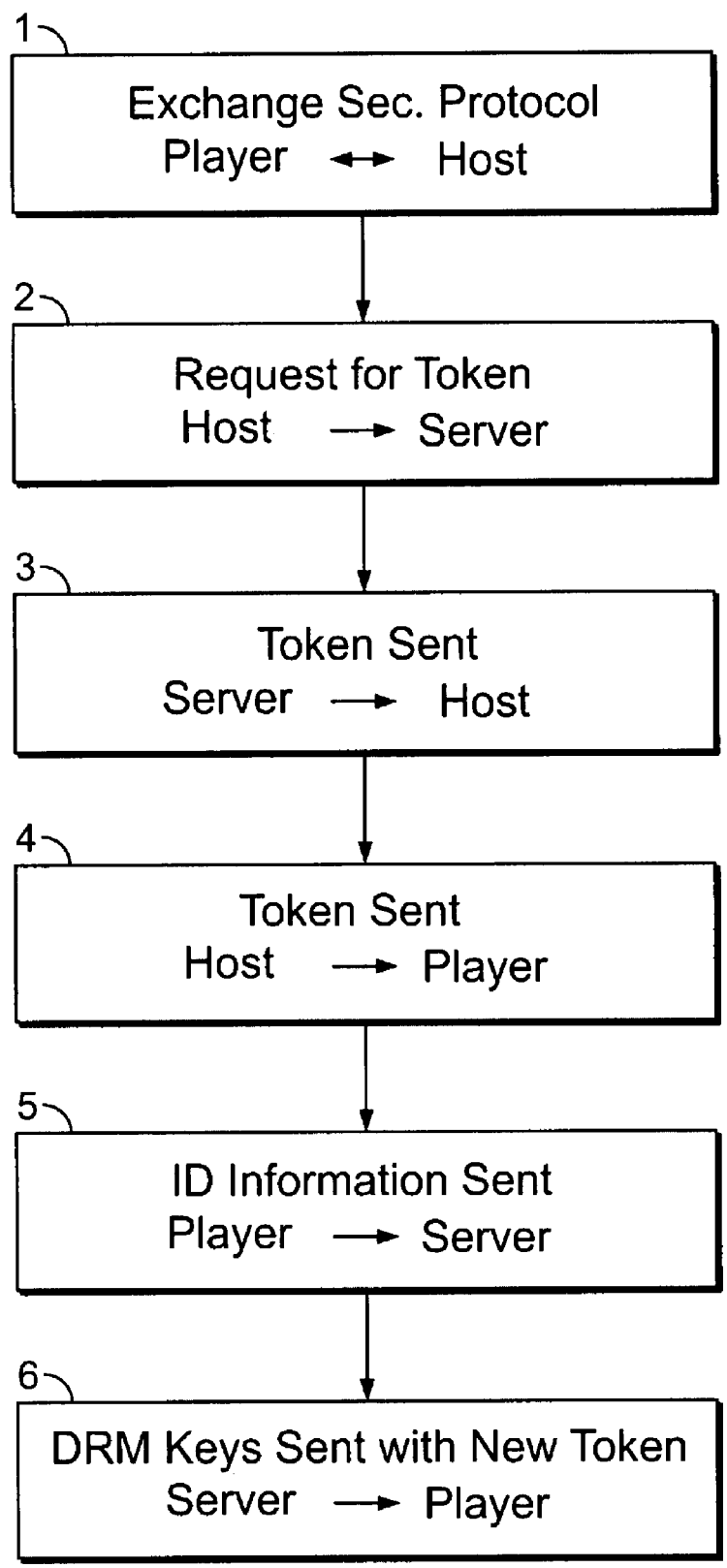
FIG. 2 is a flowchart showing the present process as carried out on the FIG. 1 system

This process is shown (in somewhat less detail) in FIG. 2 with similar numbering of the six illustrated phases of the process so that in light of the above FIG. 2 is self explanatory.

Figure 3:
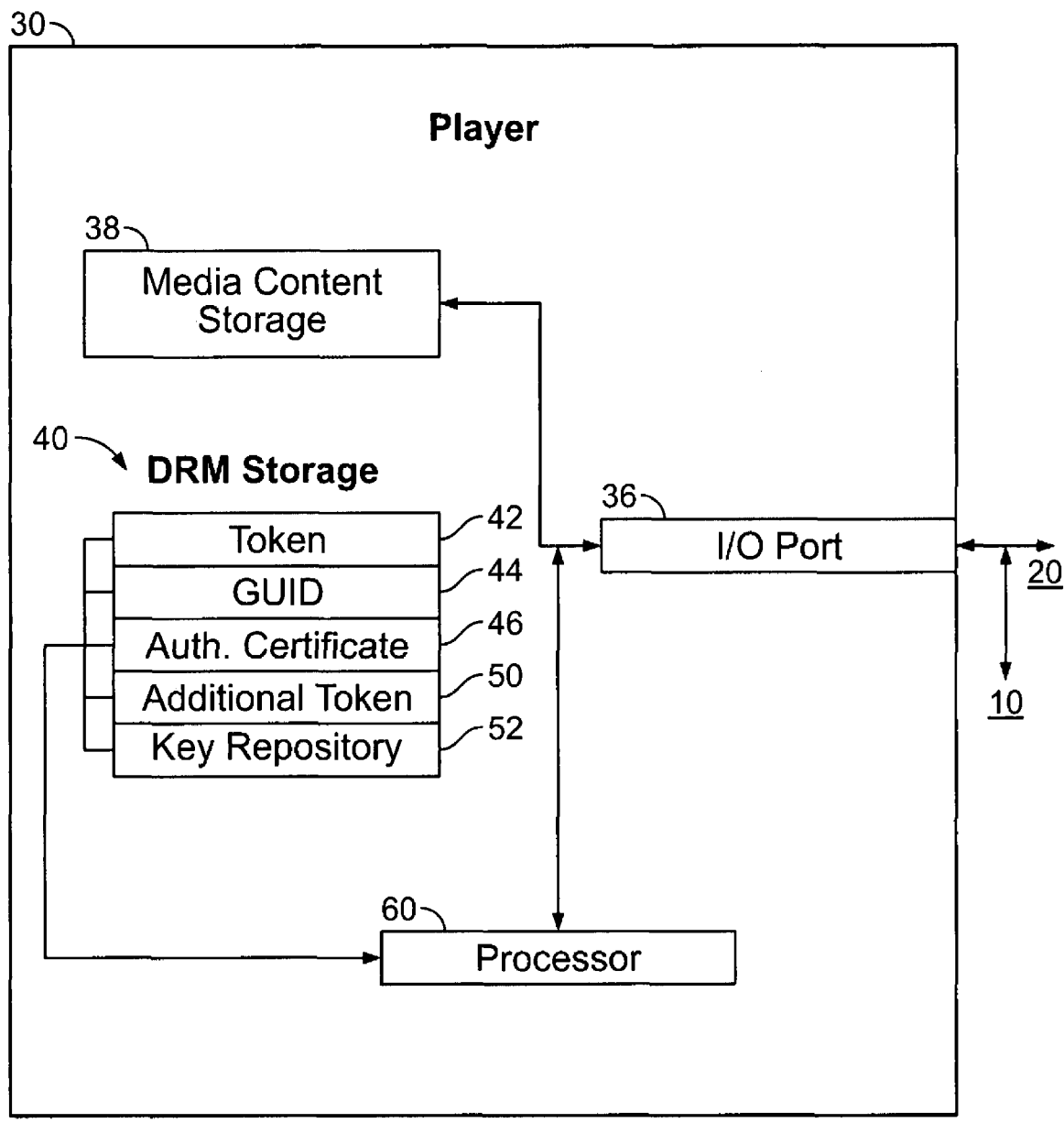
FIG. 3 is a block diagram of the DRM portion of the player of the FIG. 1 system.

FIG. 3 shows in a block diagram certain detail of the player 30 of FIG. 1, emphasizing the DRM portion of the player relevant to this disclosure. Player 30 has a conventional input/output port 36, such as a USB interface or wireless interface, for connecting to host device 20 and also suitable for coupling to the server 10, such as by an Internet connection. (Of course, this port may be implemented as two separate ports.) Coupled to port 36 is the player's conventional media (digital) content storage 38, such as flash memory or a disk drive, which stores the received media content under control of processor (such as logic or a microprocessor) 60. Also provided are the DRM storage locations 40, typically some type of secure storage, which inter alia stores the received token at 42, the GUID of the player at 44, and the authentication certificate of the player at 46 as well as storage for the additional token at 50 and key repository 52. DRM storage 40 is accessed by the processor 60, which assembles the player identification information there from and transmits it (see step 5 in FIG. 2) via port 36. The processor 60 also carries out the other aspects of the present process as explained herein for purposes of the token exchange at the player.

It is to be understood that the process of FIG. 2 is typically carried out by a conventional combination of computer hardware and software resident in each of the server, host device and player. The software is readily coded in light of this description, and typically is part of the otherwise conventional DRM code present in each of the server, host device, and player, and originally coded in the same computer language, and executed in object code or other form by the processor (such as processor 60 in FIG. 3) conventionally resident in each of these entities.

This disclosure is illustrative and not limiting; further modifications will be apparent to one skilled in the art in light of this disclosure, and are intended to fall within the scope of the appended claims.

We claim:

1. A computer enabled method for controlling distribution of media content between a source, a host device, and a player associated with the host device, the method comprising the acts of:
   exchanging authentication data between the player and the host device;
   transmitting a request for a token from the host device to the source;
   receiving the token at the host device wherein the token is not stored in memory allocated for keys in the host device;
   sending the token to the player;
   sending identification data from the player directly to the source including the token; and
   accessing at the player, in response to the received token, at least one key transmitted directly from the source and relating to encryption or decryption of the media content to be distributed, and an additional token for a subsequent request for media content.

2. The method of claim 1, wherein the player is one of a media player, cellular telephone, or PDA.

3. The method of claim 1, wherein the authentication data includes an authentication certificate and an encryption key.

4. The method of claim 1, wherein the token request includes a global universal identifier of each of the source and the player, and additional authentication information pertaining to the global universal identifiers.

5. The method of claim 1, wherein the token sent to the player is encrypted with a key, the key being unique to the particular player.

6. The method of claim 1, wherein the token sent to the player is encrypted with a session key relating to the exchanged authentication data.

7. The method of claim 1, wherein the identification data includes the token and a global universal identifier of each of the player and host device.

8. The method of claim 7, wherein the identification data further includes data for verifying the token, and an authentication certificate of the player.

9. A non-transitory computer readable medium carrying computer code for performing the portions of the method of claim 1 to be carried out by the source.

10. A non-transitory computer readable medium carrying computer code for performing the portions of the method of claim 1 to be carried out by the player or host device.

11. An apparatus programmed to perform the portions of the method of claim 1 to be carried out by the player or host device.

12. The method of claim 1, wherein the source is a server.

13. The method of claim 1, wherein the host device communicates with the source via the Internet, and with the player via a local connection.

14. The method of claim 13, wherein the local connection is one of a universal serial bus, a wireless connection, and a local area network.

15. A computer enabled method for controlling distribution of media content to a player from a source, the player being associated with a host device, the method comprising the acts of:
   the player exchanging authentication data with the host device;
   receiving at the player a token originating at the source, via the host device wherein the token is not stored in memory allocated for keys in the host device;
   sending identification data from the player directly to the source, the data including the token; and
   accessing at the player, in response to the received token, at least one key transmitted directly from the source and relating to encryption or decryption of the media content to be distributed, and an additional token for a subsequent request for media content.

16. The method of claim 15, wherein the player is one of a media player, cellular telephone, or PDA.

17. The method of claim 15, wherein the authentication data includes an authentication certificate and an encryption key.

18. The method of claim 15, wherein the token is provided per a request which includes a global universal identifier of each of the source and the player, and additional authentication information pertaining to the global universal identifiers.

19. The method of claim 15, wherein the token is first received at the host device as encrypted with a key, the key being unique to the particular player.

20. The method of claim 15, wherein the token sent to the player is encrypted with a session key relating to the exchanged authentication data.

21. The method of claim 15, wherein the identification data includes the token and a global universal identifier of each of the player and host device.

22. The method of claim 21, wherein the identification data further includes data for verifying the token, and an authentication certificate of the player.

23. A non-transitory computer readable medium carrying computer code for carrying out the method of claim 15.

24. An apparatus programmed to carry out the method of claim 15.

25. The method of claim 15, wherein the source is a server.

26. The method of claim 15, wherein the host device communicates with the source via the Internet, and with the player via a local connection.

27. The method of claim 26, wherein the local connection is one of a universal serial bus, a wireless connection, and a local area network.

28. A computer enabled method for controlling distribution of media content from a source to a host device for playing on a player associated with the host device, the method comprising the acts of:
- the host device exchanging authentication data with the player;
- transmitting from the host device to the source a request for a token;
- receiving the token at the host device wherein the token is not stored in memory allocated for keys in the host device; and
- sending the token from the host device to the player;
- thereby the player receiving directly from the source keys to decrypt or encrypt the media content to be distributed and an additional token for a subsequent request for media content.

29. The method of claim 28, wherein the player is one of a media player, cellular telephone, or PDA.

30. The method of claim 28, wherein the authentication data includes an authentication certificate and an encryption key.

31. The method of claim 28, wherein the token request includes a global universal identifier of each of the source and the player, and additional authentication information pertaining to the global universal identifiers.

32. The method of claim 28, wherein the token received at the host device is encrypted with a key, the key being unique to the particular player.

33. The method of claim 28, wherein the token sent to the player is encrypted with a session key relating to the exchanged authentication data.

34. The method of claim 28, wherein the player sends identification data to the host device, and the identification data includes the token and a global universal identifier of each of the player and host device.

35. The method of claim 34, wherein the identification data further includes data for verifying the token, and an authentication certificate of the player.

36. A non-transitory computer readable medium carrying computer code for performing the method of claim 28.

37. An apparatus programmed to carry out the method of claim 28.

38. The method of claim 28, wherein the source is a server.

39. The method of claim 28, wherein the host device communicates with the source via the Internet, and with the player via a local connection.

40. The method of claim 38, wherein the local connection is one of a universal serial bus, a wireless connection, and a local area network.

41. A player for storing and playing media content received from an external source, and having a digital rights management (DRM) portion, the DRM portion comprising:
- an input/output port adapted to receive the media content and to send and receive DRM information directly to and from the source;
- a storage for an authentication certificate of the player, coupled to the port;
- a storage for a global identifier of the player, coupled to the port;
- a storage for (a) an encrypted token received from the source, coupled to the port;
- a key repository, coupled to the port for storing keys for decrypting the token and the media content;
- a storage for an additional token for a subsequent request for media content, coupled to the port; and
- a processor coupled to the port and to the global identifier storage and to the token storage, for decrypting the token by a key unique to the particular player and for assembling identification data including the global identifier, the token, a signature of the token, the authentication certificate, and a size of the token signature and a size of the authentication certificate to be transmitted from the port.

* * * * *